United States Patent [19]

Hasegawa et al.

[11] Patent Number: 4,804,242

[45] Date of Patent: Feb. 14, 1989

[54] CONNECTOR FOR OPTICAL FIBER

[75] Inventors: Kazuo Hasegawa; Yoshinori Miyahara, both of Furukawa, Japan

[73] Assignee: Alps Electric Co., Ltd., Japan

[21] Appl. No.: 841,810

[22] Filed: Mar. 20, 1986

[30] Foreign Application Priority Data

Mar. 20, 1985 [JP] Japan .................................. 60-40101

[51] Int. Cl.$^4$ ................................................ G02B 5/14
[52] U.S. Cl. .................................................. 350/96.20
[58] Field of Search ................ 350/96.20, 96.21, 96.22, 350/96.23

[56] References Cited

U.S. PATENT DOCUMENTS

| | | | |
|---|---|---|---|
| 4,101,198 | 7/1978 | Heldt | 350/96.20 |
| 4,146,299 | 3/1979 | Wellington et al. | 350/96.21 |
| 4,204,306 | 5/1980 | Makuch | 350/96.20 |
| 4,354,731 | 10/1982 | Mouissie | 350/96.20 |
| 4,427,879 | 1/1984 | Becher et al. | 350/96.20 |
| 4,429,949 | 2/1984 | Cartier | 350/96.21 |
| 4,448,483 | 5/1984 | Ryley, Jr. | 350/96.21 |
| 4,541,685 | 9/1985 | Anderson | 350/96.20 |
| 4,674,833 | 6/1987 | Des Forges et al. | 350/96.21 |
| 4,679,895 | 7/1987 | Huber | 350/96.21 |
| 4,696,537 | 9/1987 | Bauer et al. | 350/96.2 |
| 4,697,871 | 10/1987 | Cook | 350/96.2 |

Primary Examiner—Deborah L. Kyle
Assistant Examiner—Michael J. Carone
Attorney, Agent, or Firm—Guy W. Shoup; Paul J. Winters; Leighton K. Chong

[57] ABSTRACT

A connector for an optical fiber in which an optical fiber and an optical conversion element are detachably coupled together, and optical fibers are mutually coupled together. The connector comprises a holding member composed of a front tube for holding the optical fiber and a rear tube for holding an optical fiber cable, the rear tube being formed with a slit in an axial direction thereof, the rear tube portion having a fixed tube fitted thereover to press the rear tube. The rear tube is formed with notches which intersect the slits, corner portions formed in the notches and the optical fiber cable are positioned in the intersecting relation, the corner portions being pressed against and brought into contact with the optical fiber cable by the pressing force of the fixed tube.

5 Claims, 4 Drawing Sheets

# CONNECTOR FOR OPTICAL FIBER

BACKGROUND OF THE INVENTION

1. Field of the Invention

The present invention relates to a connector for an optical fiber in which an optical fiber and an optical conversion element are detachably coupled together or optical fibers are detachably coupled each other, and particularly relates to the construction of a connector which has improved a retaining performance of the optical fiber.

2. Description of the Prior Art

An optical information transmission system using optical fibers and optical conversion elements has been used increasingly. People expect much from optical fibers as one of information transsission lines which are less loss yet large capacity.

The optical information transmission system has to use a connector in order to couple the optical fiber to the optical conversion element or couple the optical fibers each other.

One example of a conventional coupling construction in the optical conversion element and optical fibers will be described with reference to FIGS. 8 to 10.

A holding member 1 comprises a front tube portion 1a, a rear tube portion 1b and a flange portion 1c provided therebetween. A plurality of slits 1d are formed in an axial direction in the outer peripheral surface of the rear tube portion 1b, an optical fiber 2 is inserted through the rear tube portion 1 to hold the optical fiber 2 at the front tube portion 1a, and an optical fiber cable 3 coated by a coating portion 3a is held on the rear tube portion 1b. Then, a fixed tube 4 is fitted over the rear tube portion 1b to reduce the diameter of the rear tube portion 1b, and a corner portion 1f formed in the inner peripheral surface of the slit 1d which is in parallel therewith and presses and contacts the outer peripheral surface of the optical fiber cable 3 in the same axial direction to fix the optical fiber cable 3. Further, the front tube portion 1a of the holding member 1 is inserted into a tube portion 6a of an optical receptacle 6 internally provided with an optical conversion element 5, and a cap nut 7 having a projection 7a in the inner periphery thereof is threadedly engaged with the tube portion 6a of the optical receptacle 6 whereby the optical conversion element 5 and the optical fiber 2 may be detachably coupled.

However, the above-described prior art has the following difficulties.

The corner portion 1f of the slit 1d presses and contacts the outer peripheral surface of the optical fiber cable 3 in the same axial direction to fix the optical fiber cable 3. Therefore, the outer peripheral surface of the optical fiber cable 3 and the inner peripheral surface of the rear tube portion 1b are merely in contact with each other in the same axial direction, and after a lapse of time, the optical fiber cable 3 is axially displaced or tends to be slipped out of the holding member 1. Moreover, the fixed tube 4 and the rear tube portion 1b are also merely in the state of surface contact, and when an axial careless force is applied to the fixed tube 4, the fixed tube 4 is often encountered to be slipped out.

For these reasons, the coupling efficiency of the optical fiber and optical conversion element or the mutual optical fibers is deteriorated, thus bringing forth unfavorable results for the optical information transmission system.

There is further shown in FIG. 9 a system in which uneven portions 1e are provided in the inner peripheral surface of the rear tube portion 1b, and the uneven portions 1e are brought into contact with the coating portion 3a to prevent the optical fiber from being slipped out. Also in this case, the sleeve still tends to be slipped out of the holding member 1, and the optical fiber is also possibly displaced in the axial direction. Moreover, since the uneven portions 1e are provided in the inner peripheral surface of the rear tube portion 1b, costs of parts for the holding member 1 increase accordingly, thus not only increasing the cost of products but failing to fully display the function of the connector for the optical fiber.

SUMMARY OF THE INVENTION

It is therefore an object of the present invention to provide a connector for optical fibers in which the optical fibers are positively secured to the holding member, the coupling efficiency inherent in the connector for the optical fibers may be enhanced, and installing and removing operation for the optical fibers may be extremely easily performed, while removing various difficulties noted above with respect to the prior art.

In order to achieve the aforesaid object, the present invention provides a connector for an optical fiber comprising a holding member composed of a front tube portion for holding the optical fiber and a rear tube portion for holding an optical fiber cable, the rear tube portion being formed with a slit in the axial direction thereof, the rear tube portion having a fixed tube fitted thereover to press the rear tube portion, wherein the rear tube portion of the holding member is formed, in a contactable surface thereof to be fitted and in contact with the fixed tube when the latter is fitted thereover, with more than one notches which intersect the slit, corner portions formed in the inner peripheral surfaces of the notches and the optical fiber cable are positioned in the intersecting relation, and the corner portions are pressed against and brought into contact with the optical fiber cable in the intersecting relation by the pressing force of the fixed tube.

When the optical fiber is inserted into the holding member and the fixed tube is fitted from the end of the rear tube portion of the holding member, the rear tube portion is pressed by the fixed tube to reduce the diameter centripetally the rear tube portion having the slit, and therefore, the corner portions positioned at the inner peripheral surface of the notches formed in the intersecting relation with the slit urge and come into contact with the outer peripheral surface of the optical fiber cable to positively lock the optical fiber cable to the holding member.

In this case, the corner portions are positioned in the intersecting relation with respect to the axial direction of the optical fiber cable and the corner portions urge the outer peripheral surface of the optical fiber cable. Therefore, even if the axial force is applied to the optical fiber cable, it is not blindly displaced.

BRIEF DESCRIPTION OF THE DRAWINGS

FIGS. 1 and 2 are respectively sectional views of the connector;

FIG. 3 is a separated perspective view thereof;

FIGS. 4 and 5 are respectively sectional views showing the coupling construction between the optical fiber and the optical conversion element;

FIG. 6 is a separated perspective view showing a plug for the optical fiber thereof;

FIG. 7 is a separated perspective view showing one example of a holding member;

DETAILED DESCRIPTION OF THE INVENTION AND PREFERRED EMBODIMENT

The embodiment of the connector for the optical fiber in accordance with the present invention will now be described with reference to FIGS. 1 to 7.

Figure 1:
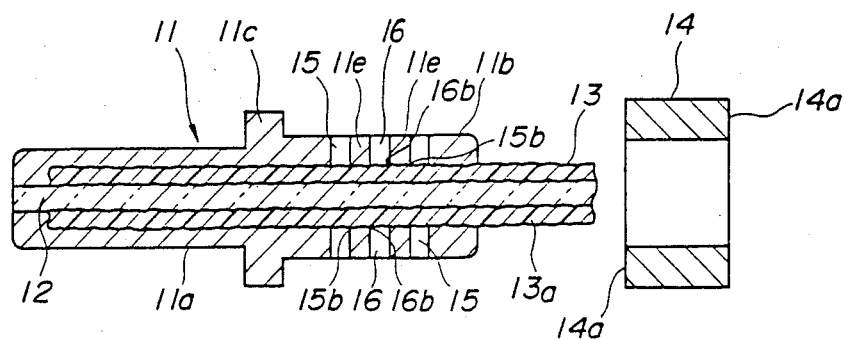
FIGS. 1 to 7 show an embodiment of a connector for an optical fiber in accordance with the present invention.
Figure 7:
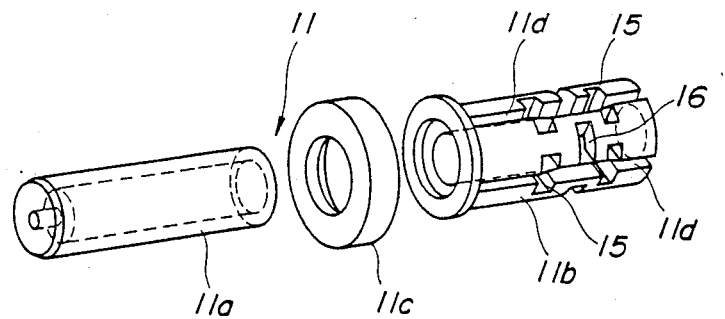
Figure 8:
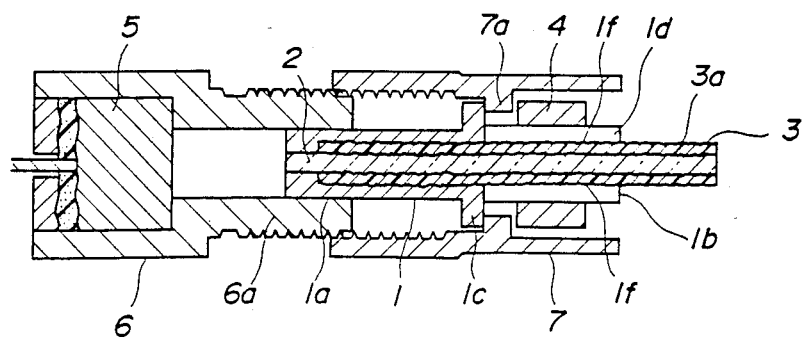
FIGS. 8 and 9 are respectively sectional views showing prior art.
Figure 9:
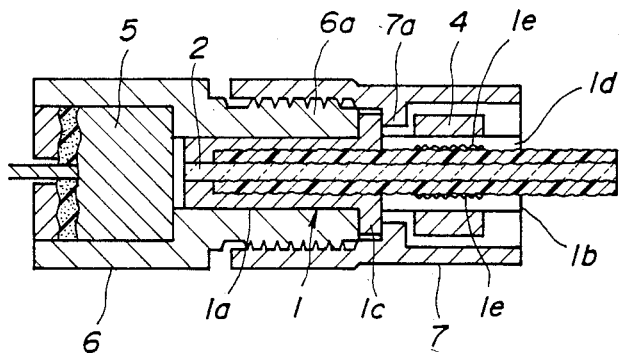
Figure 10:
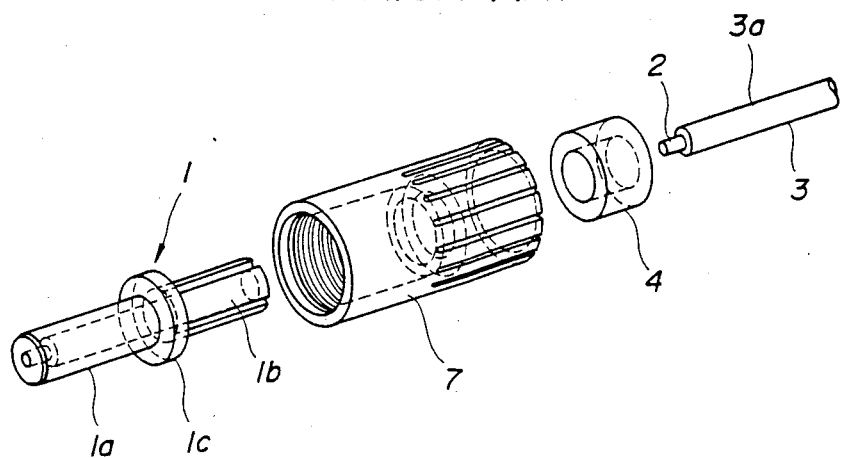
FIG. 10 is a separated perspective view showing a plug for the conventional optical fiber.

Referring now to FIG. 1, a holding member 11 comprises a front tube porton 11a forwardly thereof, a flange portion 11c in the middle portion thereof, and a rear tube portion 11b rearwardly thereof, these portions being integrally formed. Alternatively, as shown in FIG. 7, the front tube portion 11a, the rear tube portion 11b and the flange portion 11c can be formed separately, which are connected together by means such as adhesives, pressure bonding, etc. to form the holding member 11. The rear tube portion 11b of the holding member 11 is formed with a few slits 11d in the axial direction of the holding member 11.

A forward portion of an optical fiber 12 is inserted into and held by the front tube portion 11a, an optical fiber cable 13 having a coating portion 13 having the outer peripheral portion of the optical fiber 12 coated is inserted into and held by the rear tube portion 11b, and the fore-end surface of the optical fiber 12 and the fore-end surface of the front tube portion 11a are polished to provide for face.

A fixed tube 14 has the inside diameter slightly smaller than the outside diameter of the rear tube portion 11b so that when the fixed tube 14 is fitted over the rear tube portion 1, the rear tube portion 11b is reduced in diameter. The fixed tube 14 can be formed into suitable shape such as a circle, a square or the like according to the sectional shape of the rear tube portion 11b of the holding member 11.

The rear tube portion 11b is formed, at both ends of a pressing portion 11e to be fitted and placed in contact therewith when the fixed tube 14 is fitted, with notches 15 of suitable length which intersect the slits 11d substantially in the state of intersecting at right angles. The notches 15 are formed in the inner peripheral surface thereof with corner portions 15b which urge and contact with the outer peripheral surface of the optical fiber cable 13 in the intersecting relation.

When a coating portion 13a is swelled thickly by part of the notches 15, an engaging portion 15a of the rear tube portion 11b is raised into engagement with both ends 14a of the fixed tube 14.

The pressing portion 11e is formed with a notch 16 which intersects at right angles to the optical fiber cable 13, the notch 16 being formed in its inner peripheral surface with a corner portion 16b which forms a ridge in a circumferential direction of the optical fiber along the notches 16, which is in turn pressed against and placed in contact with the coating portion 13a of the optical fiber cable 13. The notches 15 and 16 are formed at more than one place in the intersecting relation with the axial direction of the optical fiber cable 13.

Figure 4:
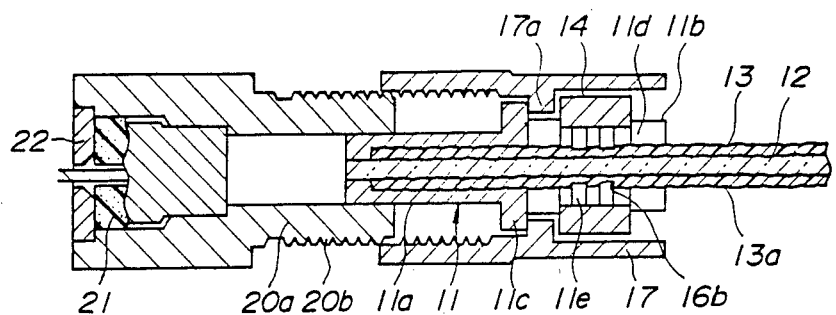
Figure 5:
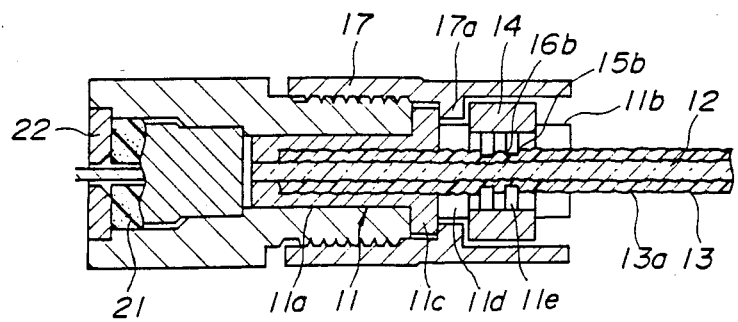
Figure 6:
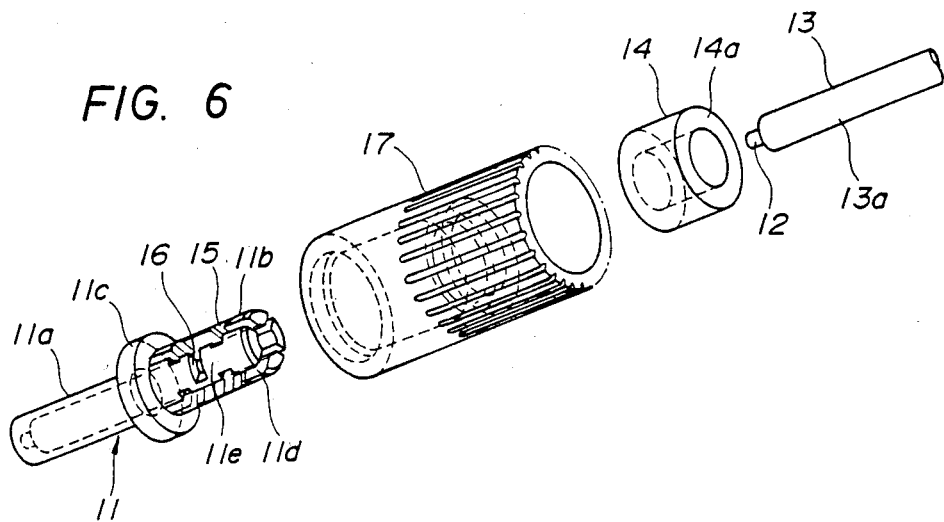

FIGS. 4 and 5 show an embodiment in which an optical fiber and an optical conversion element are coupled. A plug 18 provided with coupling means for a cap nut 17 in the outer periphery of the holding member 11 and an optical receptacle 20 encasing therein an optical conversion element 19 such as a light emitting element are coupled together.

Also in the case where the optical fibers are mutually coupled, when the holding members 11, 11 are inserted from opposite ends of an adapter not shown, it is possible to obtain a connector for detachable optical fibers.

In the figures, reference numeral 17a designates a projection formed internally of the cap nut 17, 20a a tube portion provided with an optical receptacle 20, said tube portion having threads 20b in the outer peripheral surface thereof, 21a an elastic member, and 22 a stopper.

Next, the operation of the above-described embodiment will be described.

Figure 2:
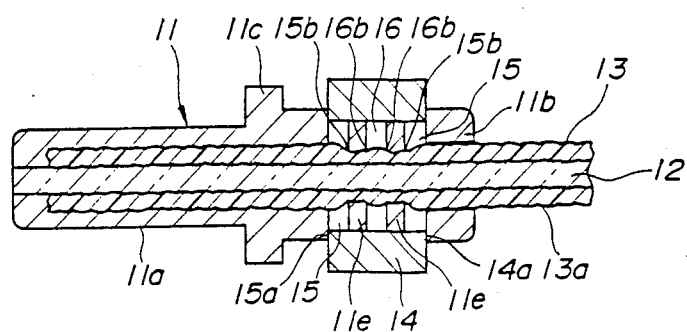
Figure 3:
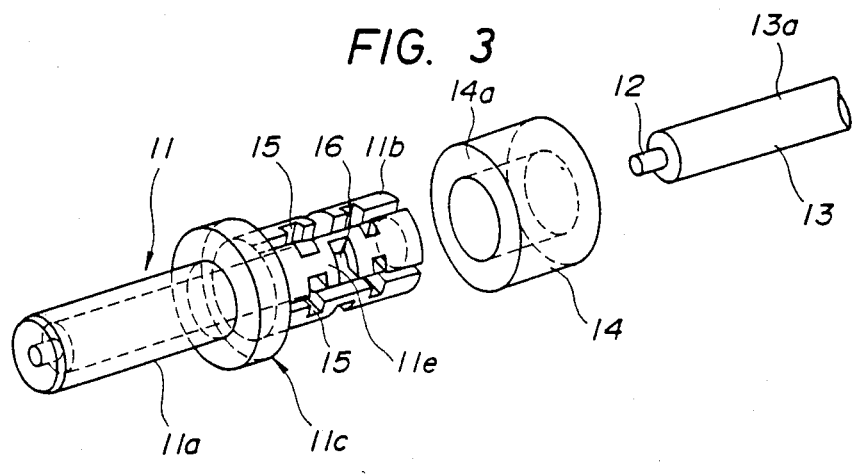

As shown in FIG. 1, the optical fiber 12 and optical fiber cable 13 are inserted into the front tube portion 11a of the holding member 11 and rear tube portion 11b, respectively. Next, the fixed tube 14 is fitted over the rear tube portion 11b, as shown in FIG. 2. Then the rear tube portion 11b having the slit 11d is reduced in diameter, and the inner peripheral surface of the fixed tube 14 having the small inside diameter urges the pressing portion 11e of the rear tube portion 11b.

The pressing portion 11e presses the coating portion 13a of the optical fiber cable 13 to thickly swell the outer end portion of the coating portion 13a, and said swelled portion causes a part of the rear tube portion 11b positioned outwardly of the notch 15 to be raised.

The engaging portions 15a, 15a provided in said raised portion and both the ends 14a, 14a of the fixed tube 14 become engaged, and therefore, the fixed tube 14 is not possibly slipped out of the rear tube portion 11b.

On the other hand, in the event the fixed tube 14 is removed, when the end of the rear tube portion 11b is pressed centripetally, the pressing portion is reduced in diameter to release the engagement between the engaging portion 15a and the ends 14a of the fixed tube 14. Therefore, the fixed tube 14 may be simply pulled out of the rear tube portion 11b, and the optical fiber 12 may be simply separated from the holding member 11.

Since the corner portions 15b and 16b formed in the inner peripheral surfaces of the notches 15 and 16 are pressed against and placed in contact with the coating portion 13a of the optical fiber cable 13 in the intersecting relation, the coating portion 13 of the optical fiber cable 13 assumes approximately a wave-like configuration and remains locked to the holding member 11 positively without axial displacement.

FIG. 4 shows an example in which an optical fiber and an optical conversion element are coupled, in which case, the optical fiber is secured to the holding member 11, and the cap nut 17 is provided on the outer periphery of the holding member 11 to constitute the plug 18.

Then, when the front tube portion 11a of the plug 18 is inserted into the tube portion 20a of the optical receptacle 20 to tighten the cap nut 17, both the elements are positively coupled together as shown in FIG. 5.

Even in this state, the optical fiber is firmly secured to the holding member 11, whereby the coupling efficiency therefor may be maintained for a long period of time.

As described above, in the present invention, more than one notches intersecting the optical fiber cable and slits are formed in the rear tube portion of the holding member, and therefore, the corner portions formed in the inner peripheral surface of the notches are pressed against and placed in contact with the outer peripheral surface of the optical fiber cable in the intersecting relation. Thus, there is no possibility that the optical fiber cable is slipped out of the holding member as compared with the prior art in which they are pressed against and placed in contact therewith in the same direction as the axial direction of the optical fiber cable.

Accordingly, the optical fiber is positively secured to the holding member and can well withstand its use for a long period of time, thus further improving the optical coupling efficiency as the optical fiber connector.

Moreover, the installing and removing operation of the optical fiber may be easily performed with the simple construction, and therefore, the practical value of the optical fiber connector is extremely great, and the connector may be produced at less cost.

What is claimed is:

1. A connector for an optical fiber cable having an optical fiber in a cable covering, said connector including a holding member comprising:
   a front tube for holding an end of the optical fiber;
   a rear tube for holding the optical fiber cable which is integrally provided with said front tube and which has an inner surface in contact with the cable covering of the optical fiber;
   at least one slit formed along said rear tube extending in an axial direction of the optical fiber;
   at least one notch intersecting said at least one slit in a circumferential direction of the optical fiber, said notch defining corner portions in the circumferential direction on the inner surface of said rear tube intersecting said slit; and
   a fixed member attached on an outer surface of said rear tube for applying pressure on said rear tube in a radially inward direction thereof to press said corner portions of said notch against the cable covering of the optical fiber in the circumferential direction in order to prevent axial displacement of the optical fiber cable from said connector.

2. A connector according to claim 1, wherein said corner portions of said notch are pressed on the cable covering of the optical fiber and causes a portion of the cable covering relatively to swell into said notch.

3. A connector according to claim 1, wherein said fixed member abuts against an outer end surface of said notch to press it radially inward.

4. A connector according to claim 1 for optically coupling the optical fiber to an optical conversion element mounted in a receptacle, further comprising a plug attached on said holding member and having a threaded portion for engagement with a corresponding portion of said receptacle.

5. A connector according to claim 1 for optically coupling two optical fibers together, wherein each of the optical fibers is held in a respective one of said holding members, and said connector further comprising an adapter having opposing ends for receiving therein the front tubes of said holding members, respectively.

* * * * *